(12) United States Patent
Menon

(10) Patent No.: US 6,834,188 B1
(45) Date of Patent: Dec. 21, 2004

(54) METHOD FOR TRACKING OUTGOING TELEPHONE CALLS FOR MULTIPLE MARITIME VESSELS

(76) Inventor: Govind Prasad Menon, 5427 Beaver Lodge, Kingwood, TX (US) 77345

( * ) Notice: Subject to any disclaimer, the term of this patent is extended or adjusted under 35 U.S.C. 154(b) by 488 days.

(21) Appl. No.: 10/054,163

(22) Filed: Jan. 22, 2002

(51) Int. Cl.[7] .................................................. H04Q 7/20
(52) U.S. Cl. ...................... 455/427; 455/406; 455/12.1
(58) Field of Search ............................... 455/3.02, 427, 455/428, 12.1, 13.1, 13.2, 13.3, 98, 450, 406, 422

(56) References Cited

U.S. PATENT DOCUMENTS

| 6,128,468 | A | * | 10/2000 | Wyrwas ...................... 455/12.1 |
| 2002/0045444 | A1 | * | 4/2002 | Usher et al. ................. 455/422 |
| 2002/0142717 | A1 | * | 10/2002 | Morimoto ................... 455/11.1 |

* cited by examiner

Primary Examiner—David Hudspeth
Assistant Examiner—Huy D Nguyen
(74) Attorney, Agent, or Firm—Wendy Buskop; Buskop Law Group, P.C.

(57) ABSTRACT

A method of using a satellite based handheld phone system for generating a telephone call from a maritime vessel using a handheld unit.

16 Claims, 8 Drawing Sheets

| Call Date | UTC Time Start | User Code | Target Phone Number | Call Duration | Call Cost | Vessel ID Number |
|---|---|---|---|---|---|---|
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |

FIG. 3

| Vessel ID Number | Call Date | UTC Time Start | User Code | Target Phone Number | Call Duration | Call Cost |
|---|---|---|---|---|---|---|
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |

METHOD FOR TRACKING OUTGOING TELEPHONE CALLS FOR MULTIPLE MARITIME VESSELS

FIELD OF THE INVENTION

The present invention relates in general to maritime outgoing telephone systems, and more particularly to a service for providing and tracking outgoing calls using a satellite network and a portable telephone, which is mounted on a maritime vessel.

The service generally permits individual caller number input at ⅓ the cost of traditional maritime phone systems. It also permits a user to view specific service information about the calls at the telephone location or other locations for which a ship owner may be responsible. Further, the invention provides multiple phones for multiple vessels and ways for tracking call duration using a maritime vessel or ship's computing systems with cross-links. The invention involves a series of steps where telephone call data is checked and matched to a particular user or to a group of users. The invention further allows for monthly monitoring and tracking of calls and the deducing of the cost of the calls from the pay of individuals on the maritime vessel. The invention includes hardware, software, and firmware.

BACKGROUND OF THE INVENTION

The inventive service uses a handheld satellite phone and a fixed mast antennae to track the duration of telephone calls, of which party placed the call by using a series of steps.

This method is an improvement over known systems, which cannot provide or track calls as inexpensively as the present system, which preferably uses the Iridium phone network.

The present invention is intended to overcome one or more of the problems with the prior art caller tracking and international telephone costs.

The invention is also related to an incoming paging system for use on maritime vessels.

SUMMARY OF THE INVENTION

The present invention contemplates a method of using a satellite based handheld phone system for generating a telephone call from a maritime vessel using a handheld unit comprising a dial pad, transmit button, disconnect button, lifetime timer and a call control button and an integral antennae, a base secured to the maritime vessel for cradling the handheld unit, and an antennae secured to the maritime vessel for receiving calls initiated from the handheld unit and transmitting them to a satellite phone network, wherein the method comprises the steps of:

dialing a desired number on the dial pad of the handheld unit to initiate a telephone call and pressing the transmit button; transmitting from the handheld unit to the antennae secured to the maritime vessel; transmitting from the antennae to a satellite phone network; communicating from the satellite phone network to a voice server; connecting from the voice server to a local country voice server to connect with the target phone number for a specific duration; disconnecting from the target phone number when the specific duration is complete by engaging the disconnect button; using the call control button for viewing the specific duration of the telephone call; tracking each initiated and completed telephone call with a user log, wherein the user log comprises: a date of the telephone call, a UTC time when the telephone call was initiated, a code assigned to a user of the handheld unit, the target number, the duration of the call; a cost for the call, and a maritime vessel identification number; creating a monthly report of all telephone calls made with a given maritime vessel identification number denoting a date for each telephone call, a UTC time when the telephone call was initiated, a code assigned to a user of the handheld unit, each target number, the duration of each call, and a cost for each call; using the lifetime timer to view the total duration of all telephone calls made from the handheld unit; correlating the monthly report with the lifetime timer to determine if there is any unallocated time and the cost associated with that time; computing the cost for each code assigned to a user of the satellite based phone system and creating a cost report; using the cost report to deduct the cost associated with a particular code from pay of the user corresponding to that particular code; and using the cost report to deduct the cost of any unallocated time from a pre-established credit for the maritime vessel.

DETAILED DESCRIPTION OF THE PREFFERED EMBODIMENTS

The present invention relates to a method of using a satellite based handheld phone system for generating a telephone call from a maritime vessel using a handheld satellite phone unit. The handheld unit particularly comprises a dial pad, a transmit button, a disconnect button, a lifetime timer for tracking minutes called from the handheld unit, and a call control button. The handheld satellite phone preferably has an integral antennae, a base secured to the maritime vessel for cradling the handheld satellite phone unit and a latching means or security strap for holding the handheld satellite phone system to the base. The invention further comprises an antennae, preferably a fixed mast antennae secured to the maritime vessel for receiving calls initiated from the handheld unit and transmitting them to a satellite phone network. The antennae are most preferably non-removably attached to the maritime vessel.

Figure 1:
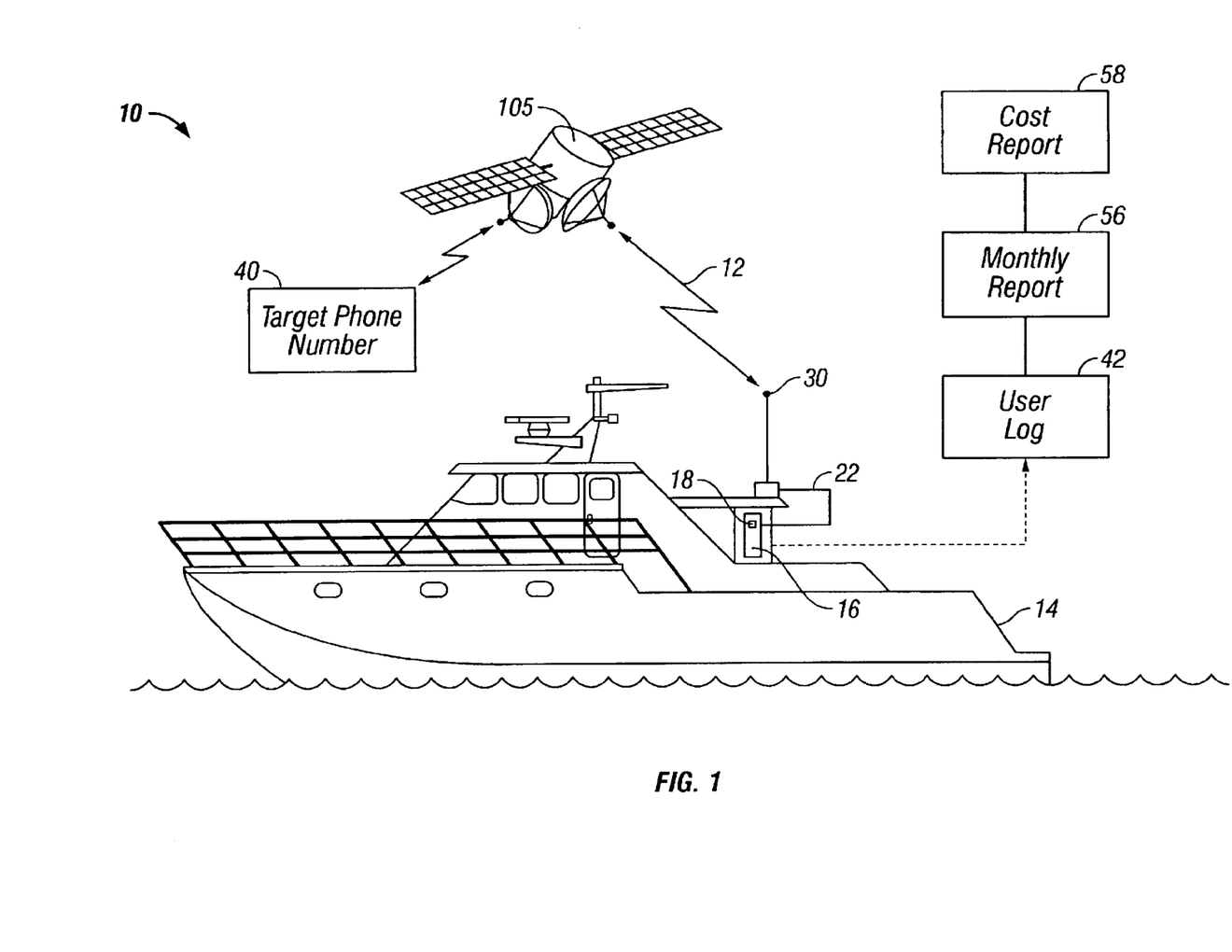
FIG. 1 is a representation of the series of steps used to operate the telephone system of the invention.
Figure 2:
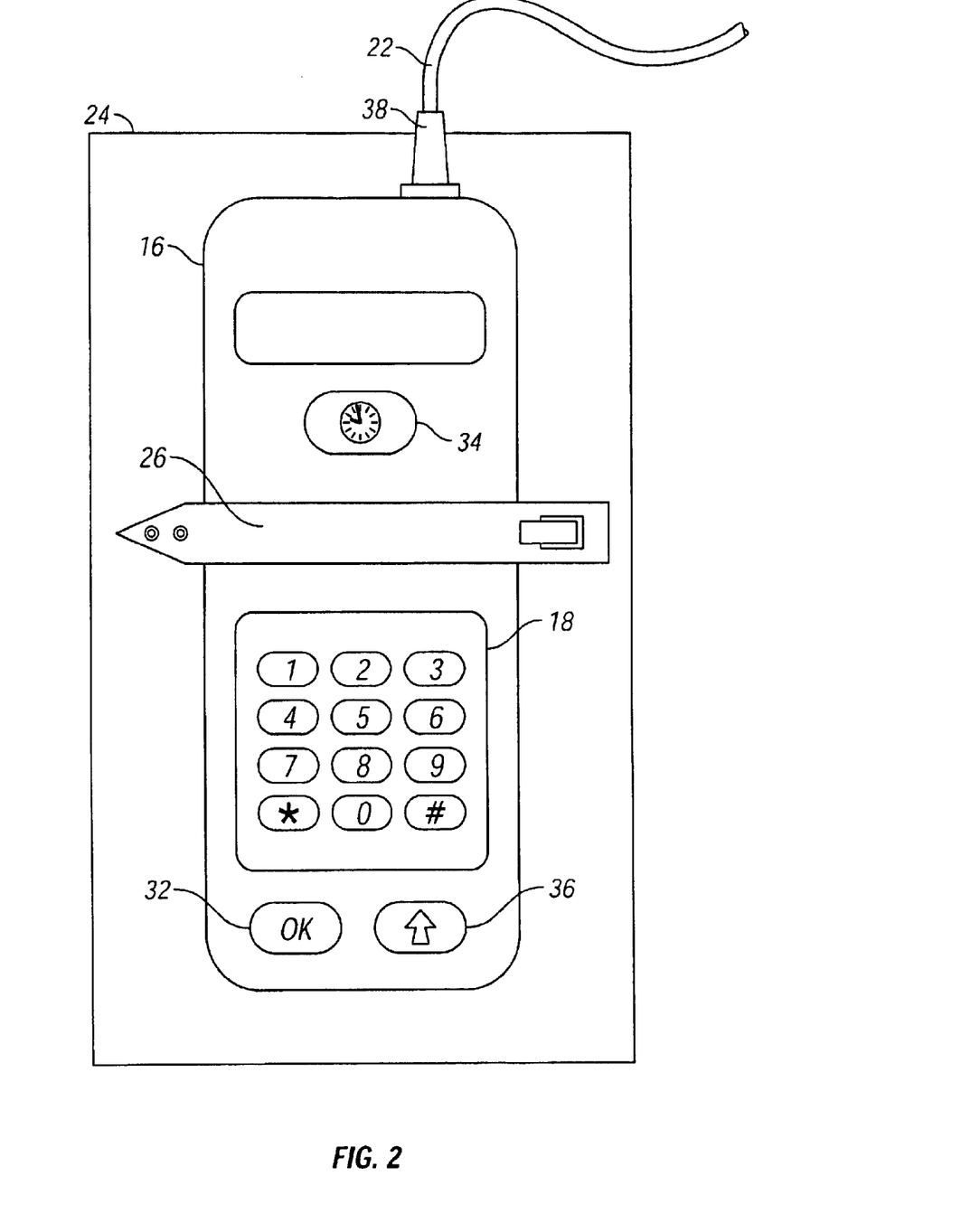
FIG. 2 is a detail of the handheld phone unit in the base according to the invention.
Figure 6:
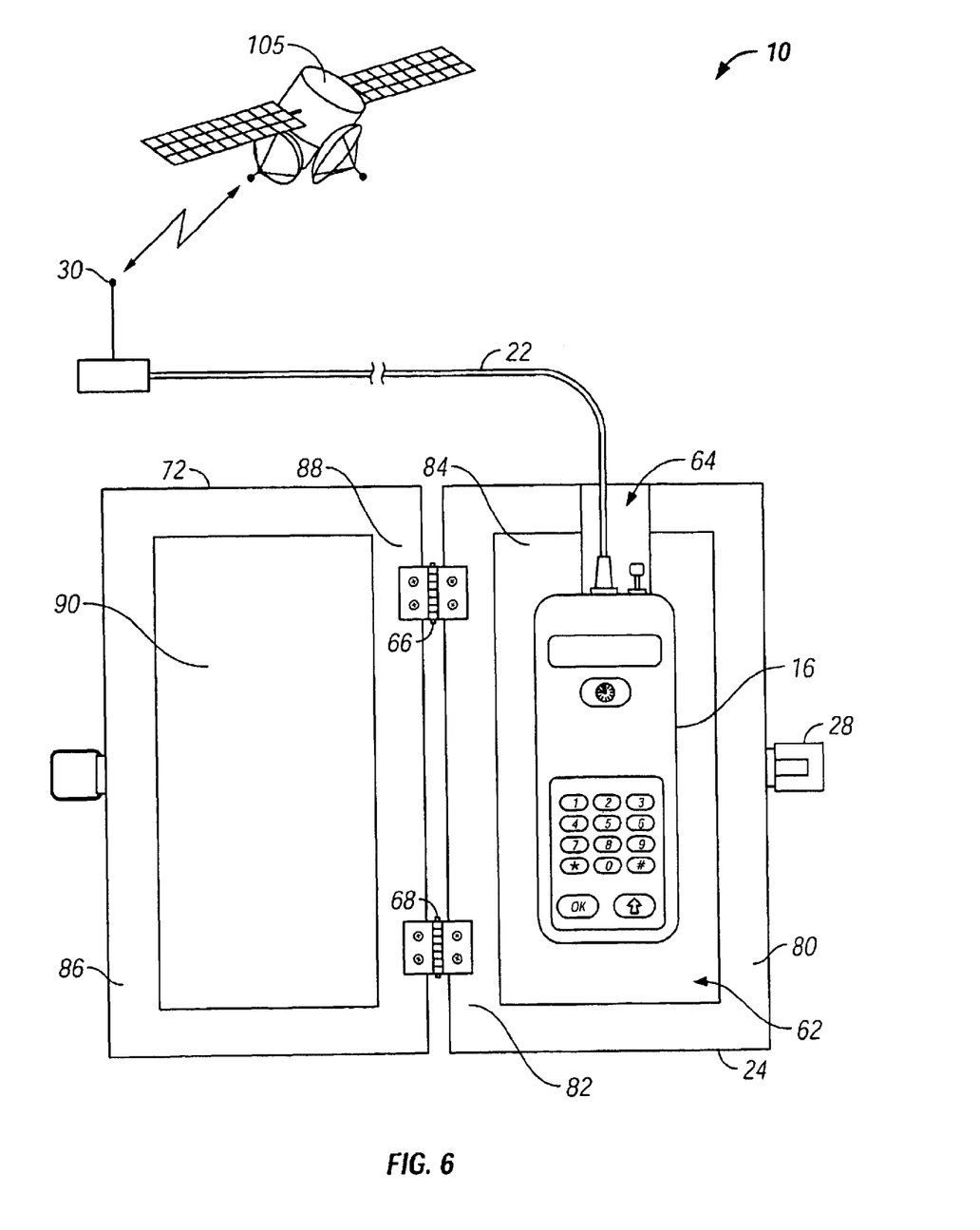
FIG. 6 is a detail of the box-type top and base for use with the handheld phone unit of the invention.

Referring to FIG. 1 the method is particularly described. This novel method comprises the steps of using a satellite based handheld phone system 10 to make a telephone call 12 from a maritime vessel 14 by using a handheld satellite phone unit 16, which is shown in more detail in FIG. 2 to dial a desired number or target phone number on the dial pad 18 of the handheld satellite phone unit 16 (hereafter referred to as the handheld unit 16). The transmit button is shown as item 32 in FIG. 2 is then depressed to initiate a telephone call 12 from the handheld unit. The handheld unit 16 then transmits to an antennae 30 via a cable 22 which is removably secured to the maritime vessel 14 or fixedly secured to the maritime vessel 14. When not in use, the handheld unit 16, is cradled in a base (shown in more detail in FIG. 2 as base 24) and secured to that base with either a strap 26, or alternatively, a latching mechanism 28 which is shown in FIG. 6.

The handheld unit as shown in FIG. 2 preferably has, in addition to the dial pad 18 and transmit button 20, a disconnect button or "OK button" 32, a lifetime timer feature 34, a call control button 36 and an integral antennae 38.

In operating the call, the handheld unit transmits the signal via cable 22 to the antennae 30, which in turn, transmits the call to a satellite phone system 10 to connect to a target phone number 40.

Once connected to a target phone number 40, the handheld unit 16, can track the call and the user on the maritime vessel can view the actual of the duration of the call for each target phone number 40 called using the call control button 36. Once the telephone call is completed, the user can disconnect from the target phone; number 40 by engaging the disconnect button or "OK button" 32 on the handheld unit 16.

Figure 3:
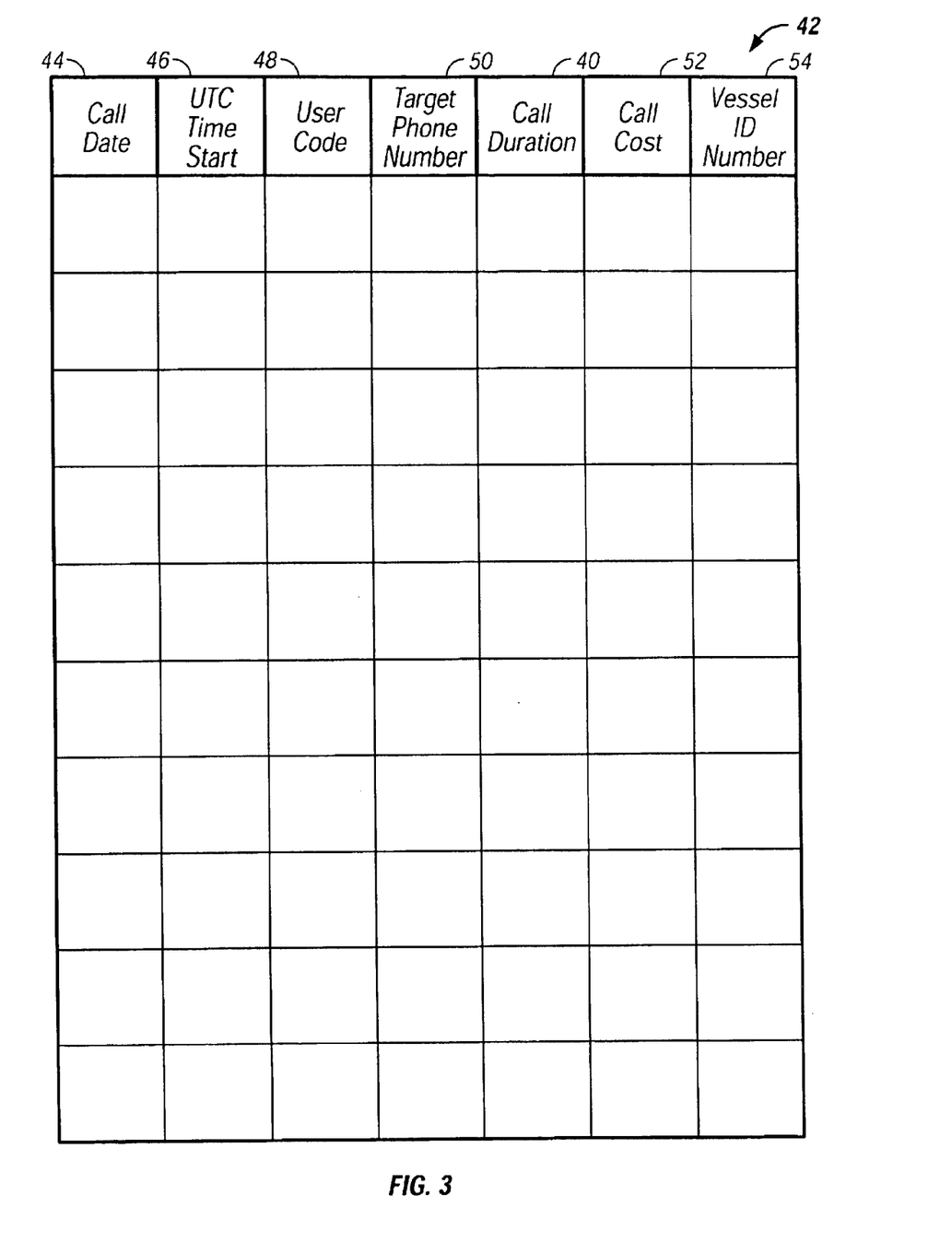
FIG. 3 is a detail of a typical user log according to the invention.

Each placed call can be tracked with a user log 42 shown in FIG. 3. In the most preferred embodiment, the user log 42 can have entries for any one or more of the following: the date of the telephone call 44, a UTC time when the telephone call was initiated 46, a code assigned to a user of the satellite based phone system 48, the desired or target number 40, the duration of the call 50; a cost for the call 52, and a maritime vessel identification number 54. At the end of each month of service, a monthly report 56 of all telephone calls made with a given maritime vessel can be created.

Figure 4:
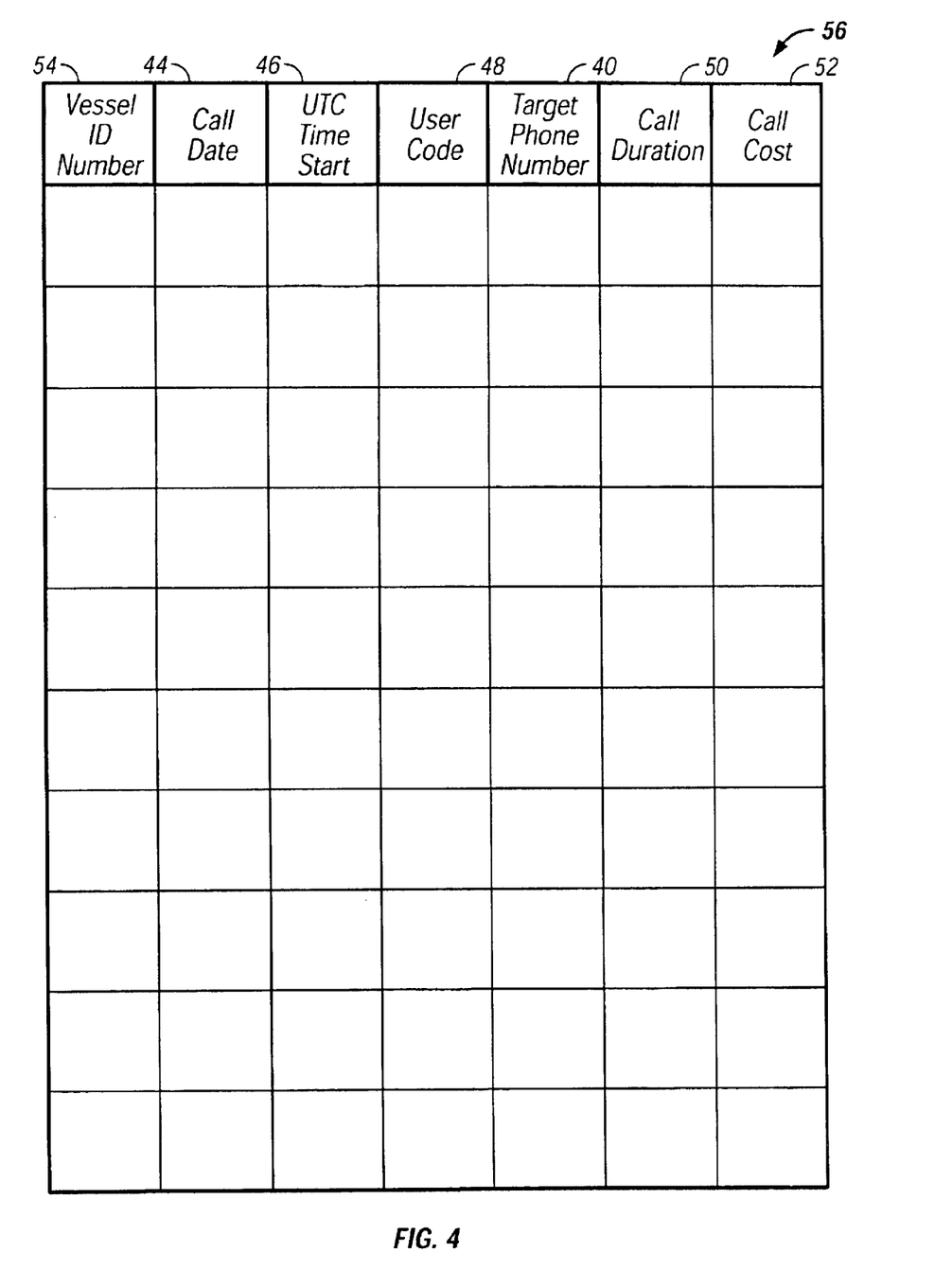
FIG. 4 is a detail of a typical monthly report according to the invention.

The monthly report 56 is more particularly shown in FIG. 4. This report can have one or more of the following entries, the maritime vessel identification number 54 denoting a date for each telephone call 44, a UTC time when the telephone call was initiated 46, a code assigned to a user of the satellite based phone system 48, each desired or target number 40, the total duration 50 of each call, and a cost for each call 52.

The lifetime timer feature 34 is then used to view the total duration of all telephone calls made from the handheld unit 16 for comparison purposes. Next, a vessel's representative, such as the ship's captain correlates the monthly report 56 with the lifetime timer 34 to determine if there is any unallocated time for which the hand held unit has been in use and the cost associated with that unallocated time. The ship's representative can then track potential users, which did not use the log or can assume the cost of the unallocated telephone time.

The next step involves the step of computing the cost for each user having a code assignment 48 and then and creating a cost report 58.

The cost report 58 is then used to deduct the particular telephone usage costs associated with a particular user code 48 from the pay or other compensation of the user corresponding to that particular user code 48. Additionally the cost report 58 can be used to deduct the cost of any unallocated time from a pre-established credit for the maritime vessel.

In an alternative embodiment, the satellite telephone company can provide a phone usage report indicating the date, UTC time, country location, and target phone number, via email on the simcard number of the handheld unit or via fax to the maritime vessel for the ship's representative to use and correlate to the lifetime timer of the handheld unit 34.

One of the advantages of the invention, is that the code assigned to a user of the satellite based phone system 48 can be made up of the last two digits of a user's passport number, the two digit rank of the user on the maritime vessel, and identification number of the maritime vessel 54. The maritime vessel's identification number 54 can be one number, or one of a related group of numbers assigned to an owner. If a related group is assigned, it enables a fleet owner to more easily track the phone usage on a fleet wide basis, rather than simply on a ship-by-ship basis.

The invention also contemplates using a software program to assist in the computing of usage of the phone system and the associated costs for each user by having a spreadsheet installed on a PC of the maritime vessels for computing the various reports. To make the reports the most simple, it is contemplated that the duration and cost calculations be done only based on whole minutes, rather than minute and second combinations.

The method and related apparatus are contemplated for use on maritime vessels which can be a drilling platform, or some type of moveable floating vessel, such as a cargo ship, a semi-submersible tender, a hovercraft, a hydrofoils, a tanker, a tug, a smaller boat, such as a patrol boat, a luxury yachts or combinations of these forming fleets.

One of the handheld units and its associate satellite networks which is preferred for this invention is the Iridium phone and related satellite network.

In the most preferred embodiment of the invention, the antennae 30 is a fixed mast antennae.

In another embodiment of this method, the monthly report is faxed to the satellite phone network prior to correlation with the lifetime timer. Alternatively, the monthly report is emailed to the maritime vessel for correlation with the lifetime timer.

It is also contemplated that the monthly report 56 may be used by the satellite telephone network company to produce an invoice to each maritime vessel.

In the most preferred mode of the invention, all inbound telephone calls are blocked to the handheld unit 16.

Finally, it is within the scope of the invention that a locking feature on the hand held unit to prevent electronic use of the handheld unit.

Figure 5:
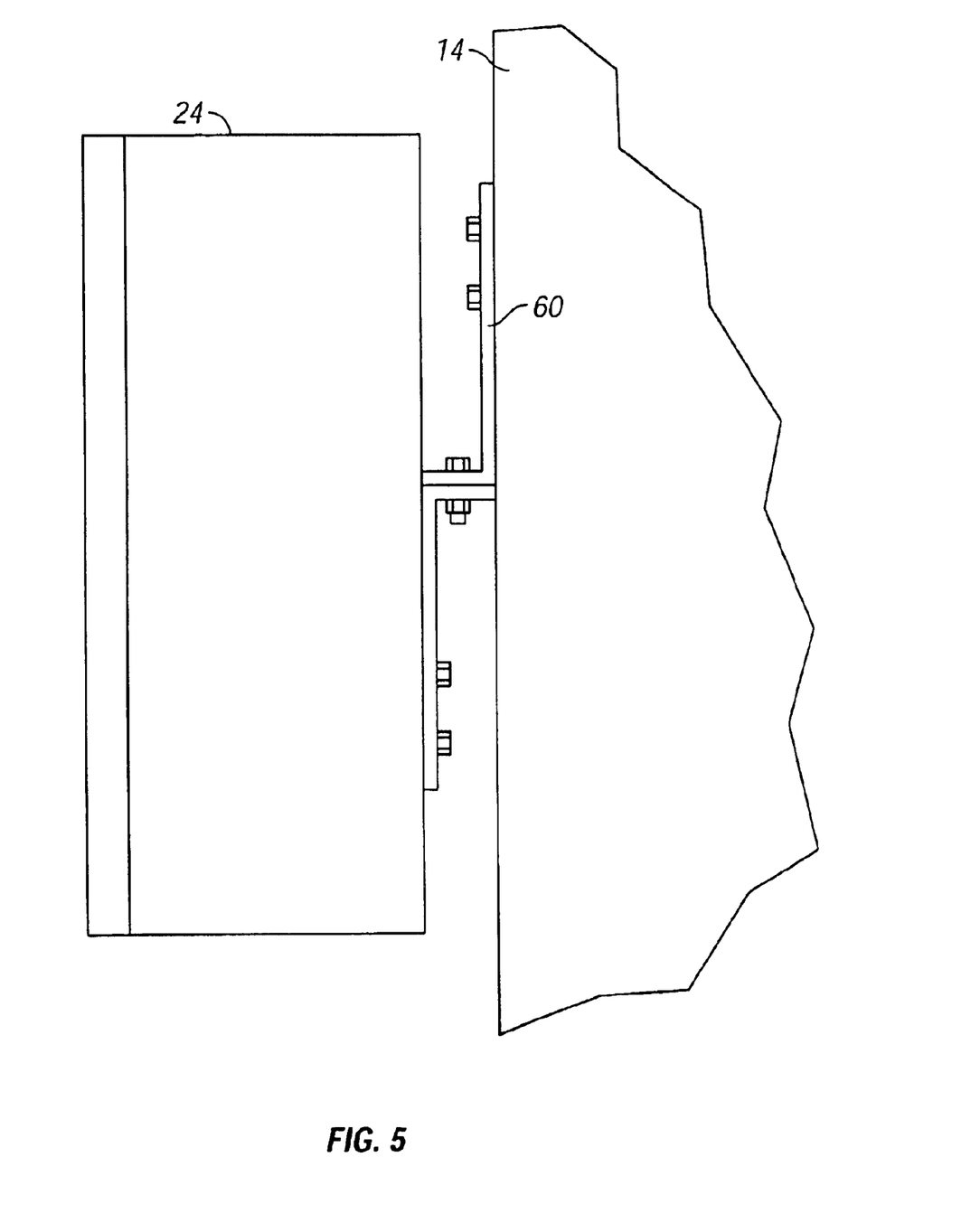
FIG. 5 is a mounting bracket for the base onto the maritime vessel according to the invention.

The device of the handheld unit, base and antennae are shown in FIG. 2. In this Figure, a handheld unit 16 comprising a dial pad 18, a transmit button 20, a disconnect button 32, a lifetime timer 34, a call control button 36, and an integral antennae 38. The handheld unit 16 is supported, when not in use, on a base 24 for holding with the handheld unit 16. In the most preferred embodiment, it is contemplated that the base 24 is permanently fixed to the maritime vessel 14. The base 24 is attached to the maritime vessel with an optional mounting bracket 60 shown in FIG. 5. Conventional mounting brackets are contemplated as usable for attaching the base to the vessel 14. A strap 26 can be passed through the base 24 to secure the handheld unit 16 to the base 24.

FIG. 6 shows an alternative way to secure the handheld unit to the base 24. In this embodiment, a latching mechanism 28 which can be a two-part latch or a one-part latch can be used to secure the handheld unit 16 to the base 24.

In one embodiment, the base 28 comprises a longitudinal recessed space 62 for cradling the handheld unit 16 and a horizontal recessed space 64 for cradling the integral antennae 38 of the handheld unit 16.

Antennae 30 is mounted in close proximity to the base 28 and secured to the maritime vessel. These antennae 30 receive and transmit calls from the handheld unit to a satellite phone network 10.

In alternative embodiments of the invention, the latching mechanism 28 can additionally comprise at least one hinge 66 or with optionally a second hinge 68. In still another embodiment, the latching mechanism 28 can be of a one-piece construction having a locking feature comprising a latch enabling the handheld unit to be secured onto the base and locked with a padlock.

The most preferred embodiment, involves a two part latching mechanism shown in FIG. 6 having the latch mechanism 28 with receiving eyebolt 70 which can be made from metal. Additionally this latch mechanism has two hinges, 66 and 68 for attaching a top to base 24. It is contemplated that the base and top can be fabricated from wood, metal or combinations thereof.

In still another embodiment of the invention, the system can comprise: a handheld unit comprising a dial pad, transmit button, disconnect button, lifetime timer, a call control button and an integral antennae; a base for holding with the handheld unit. The base is permanently fixed to the maritime vessel and a strap 26 is used for restraining the handheld unit into the base. In this embodiment, the base uses the same recesses, a longitudinal recessed space for cradling the handheld unit and a horizontal recessed space for cradling the integral antennae of the handheld unit. The antennae 30 is connected by cable 22, and is in close proximity to the base 24, and the antennae 30 is secured to the maritime vessel for receiving calls initiated from the handheld unit and transmitting them to a satellite phone network.

Figure 7:
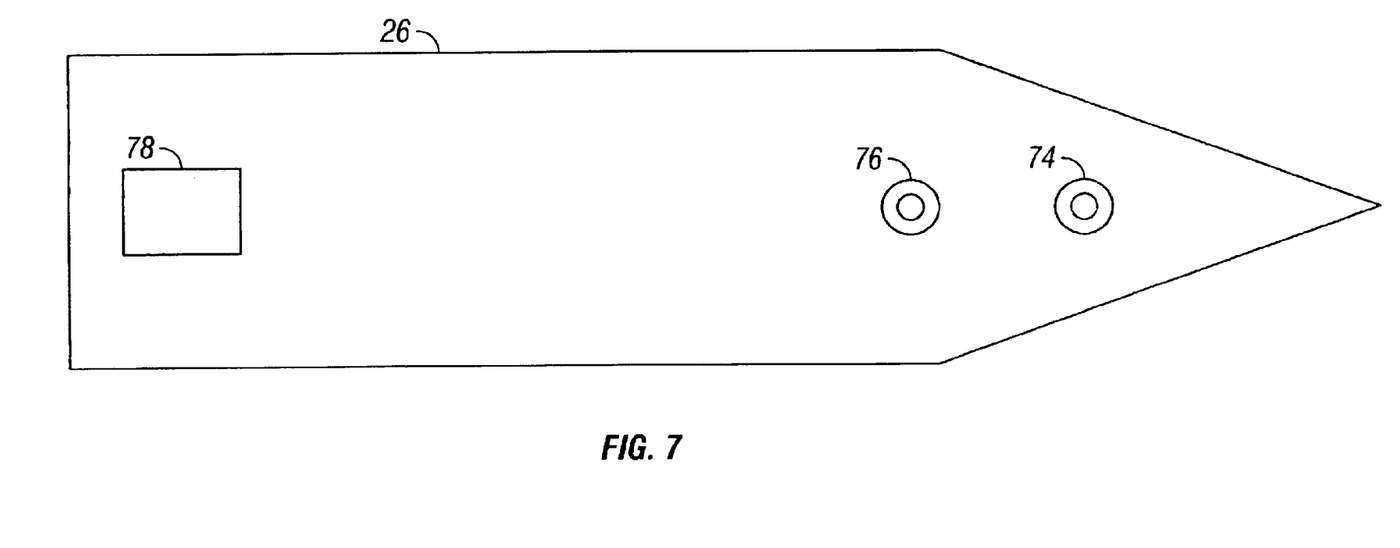
FIG. 7 is a top view of a securing strap, which can be used according to the invention.

In this embodiment the securing strap can be is a weather resistant, durable plastic material, or a ballistic nylon. It is also contemplated that the strap 26 can have the shape and dimensions shown in FIG. 7. The strap can be a one-piece construction having a first grommet 74 and a second grommet 76 and a slot 78 to creating a locking closure around the handheld unit. This one-piece strap has significant advantages by being lower in cost than other restraining devices. Alternatively, the strap can be a two-piece construction with a Velcro™ closure.

More detail is now provided about the embodiment of FIG. 6. In this embodiment, the base 24 has a three-sided construction having a first base side 80, a second base side 82, and a bottom 84. The bottom 84 has a recess for receiving the antennae of the hand held unit. A top 72 secured to the base 24 with first hinge 66 and second hinge 68. These hinges can be alternative connectors as well. It is contemplated that other connecting mechanisms can be used to connect the top and the base, such as cotter pins, sliding pins or similar parts, which are readily available on a ship. The top 72 further has a first topside 86 a second topside 88 and a lid 90 which are preferably of the same width and length as the base 24. The connectors, that is, the hinges 66 and 68 are preferably made from brass, but gunmetal, steel, and even strong plastic and composites can be used for these parts. Any usable material is contemplated which resists degradation while the device is exposed to sea salt, sun, rain and constant use by the crew.

The base has a preferred an overall length of 8.5 inches, but can range between 4 inches in overall length of 14 inches, or at least a length so that the entire unit can be in an enclosed box. The base can have a preferred overall width of 6 inches and can range between 3 and 8 inches. Finally, the base for holding the portable handheld unit has a preferred height of 3.5 inches and can range between 3 and 5 inches. The base can have a internal space for holding the portable handheld unit which is large enough to snugly hold the portable handheld unit against the inner walls and optionally can be up to 1.5 inches of additional space around the portable hand held unit while contained within the base. As an example, a preferred dimension of the internal space for the base would be 2.5 inches in width, and can range between 2.5 and 5 inches, an internal length would be between 6 inches, but can range between 3 and 8 inches, and the internal space height would be 3 inches, with a range that could be 2 and 6 inches.

It is also contemplated that on the lid 90 can be imprinted with instructions on the internal side, or alternatively, loose instructions can be permanently or removably affixed to the internal side of lid 90.

The base 24 is most preferably contemplated to be a wooden rectangular container, but the base can be made from any durable material, such as a plastic or a metal. Alternatively, the shape of the base is alternatively contemplated to be elliptoid, conical, or other shape, which can contain the phone and not serve to cause damage to a passing crewmember or fit in a particular space on a ship better.

In still another embodiment, it is contemplated that the two part closing mechanism can be a one part closing mechanism, or another conventional closing mechanism, such as a locking sliding bolt, which would engagingly close a lid with a base.

Figure 8:
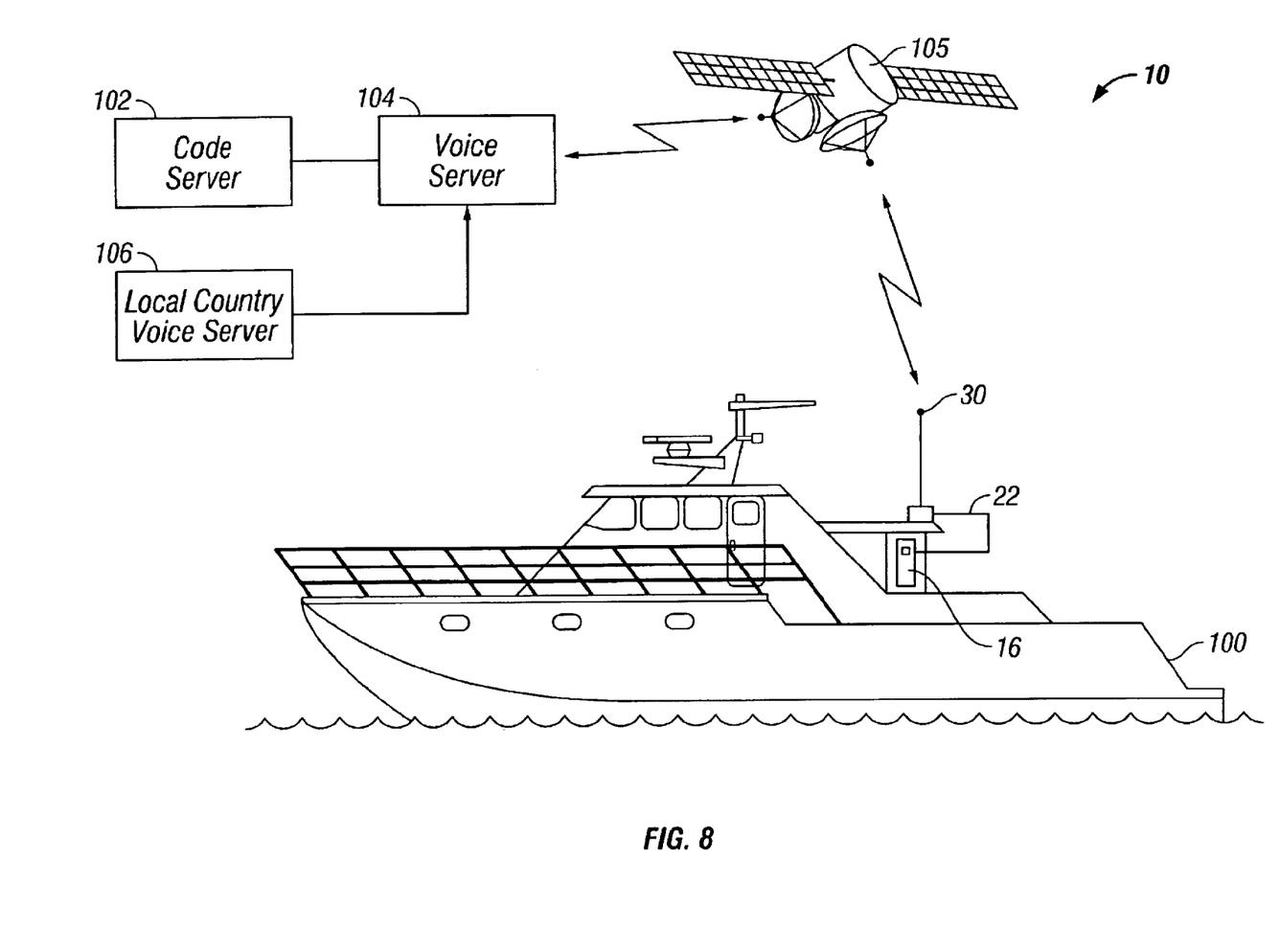
FIG. 8 is an alternative embodiment of the method for sending a phone message to a ship utilizing local country voice servers, a central server and a code server to reach a target vessel.

FIG. 8 shows another embodiment of the present invention. In this embodiment, the satellite phone on the target ship 100 can receive or send calls to a handheld unit 16 using a satellite network 10 with a code server 102 and a voice server 104. For the phone 16 on the target ship 100 to receive the call, a person on land, or in the area of a local country, calls a local country voice server 106 with the code of the satellite phone. The local country voice server then routes the call to the voice server 104, which communicates over the satellite phone network 10 which has at least one satellite 105, with a code server 102 to identify the target ship 100, which has the satellite phone of the specific code. The call is then routed from the voice server 104 to the target ship 100 having the remotely attached antennae 30 connected to the hand held unit so that the call can be completed. The logging of the call can then be handled in a manner similar to the handling for outgoing calls.

To place a call from the ship 100, a satellite based handheld phone system on the target ship 100 having a handheld unit comprising a dial pad, transmit button, disconnect button, lifetime timer and a call control button and an integral antennae, a base secured to a maritime vessel for cradling a handheld unit, and an antennae secured to the maritime vessel initiates a call and transmits to the satellite phone network. The satellite phone network communicates with the code server 102, which in turn communicates with the voice server 104 to place the call in any one local country voice servers 106, 106a or 106b. Particularly, this method involves a ship member dialing a desired number on the dial pad of the handheld unit to initiate a telephone call and pressing the transmit button; transmitting from the handheld unit which has an antennae component secured to the handheld unit and to the ship, transmitting the call via the antennae to a satellite phone network to connect to the code server, the voice server and the local country voice server to then connect to the target phone number for a particular duration; next, upon disconnecting from the target phone number by engaging the disconnect button a user on the ship uses the call control button for viewing the duration of a telephone call; the user then tracks the call which was initiated and completed telephone call with a user log, wherein the user log comprises: a date of the telephone call, a UTC time when the telephone call was initiated, a code assigned to a user of the satellite based phone system, the desired number, the duration of the call; the cost for the call, and the vessel's identification number. The ship's captain, or even the satellite service or the phone company can then create a monthly report of all telephone calls made with a given maritime vessel identification number denoting a date for each telephone call, a UTC time when the telephone call was initiated, a code assigned to a user of the satellite based phone system, each desired number, total duration of each call, and a cost for each call; then the ship's captain or CFO or other designated ship's representative can then use the lifetime timer to view the total duration of all telephone calls made from the handheld unit; correlate the monthly report with the lifetime timer to determine if there is any unallocated time and the cost associated with that time; then compute the cost for each code assigned to a user of the satellite based phone system and creating a cost report; using the cost report the ships captain or his designee can then to deduct the cost associated with a particular code from pay of the user corresponding to that particular code; and using the cost report the cost of any unallocated time can be deducted from a pre-established credit for the maritime vessel.

These and other embodiments are considered to be within the scope of the appended claims.

What is claimed is:

1. A method of using a satellite based handheld phone system for generating a telephone call from a maritime vessel using a handheld unit comprising a dial pad, transmit button, disconnect button, lifetime timer and a call control button and an integral antennae, a base secured to said maritime vessel for cradling said handheld unit, and an antennae secured to said maritime vessel for receiving calls initiated from said handheld unit and transmitting them to a satellite phone network, wherein said method comprises the steps of:

(i) dialing a desired number on the dial pad of the handheld unit to initiate a telephone call and pressing the transmit button;

(ii) transmitting from said handheld unit to the antennae secured to the maritime vessel;

(iii) transmitting from the antennae to a satellite phone network;

(iv) communicating from the satellite phone network to a voice server;

(v) connecting from the voice server to a local country voice server to connect with the target phone number for a specific duration;

(vi) disconnecting from the target phone number when the specific duration is complete by engaging the disconnect button;

(vii) using said call control button for viewing the specific duration of said telephone call;

(viii) tracking each initiated and completed telephone call with a user log, wherein said user log comprises: a date of the telephone call, a UTC time when the telephone call was initiated, a code assigned to a user of the handheld unit, the target number, the duration of the call; a cost for the call, and a maritime vessel identification number;

(ix) creating a monthly report of all telephone calls made with a given maritime vessel identification number denoting a date for each telephone call, a UTC time when the telephone call was initiated, a code assigned to a user of the handheld unit, each target number, the duration of each call, and a cost for each call;

(x) using the lifetime timer to view the total duration of all telephone calls made from the handheld unit;

(xi) correlating the monthly report with the lifetime timer to determine if there is any unallocated time and the cost associated with that time;

(xii) computing the cost for each code assigned to a user of the satellite based phone system and creating a cost report;

(xiii) using the cost report to deduct the cost associated with a particular code from pay of the user corresponding to that particular code; and (xiv) using the cost report to deduct the cost of any unallocated time from a pre-established credit for the maritime vessel.

2. The method of claim 1, further comprising the step of a satellite telephone company providing a report indicating the date, UTC time, country location, target number, via email on the simcard number of the handheld unit.

3. The method of claim 1, wherein the code of the caller comprises 2 digits of a passport number, a two-digit rank for a caller on the maritime vessel, and identification number of the maritime vessel.

4. The method of claim 1, wherein the maritime vessel's identification number is one of a related group of numbers assigned to an owner.

5. The method of claim 1, further comprising a software program installed on a PC of the maritime vessel's for computing the various reports.

6. The method of claim 1, wherein said maritime vessel is a drilling platform.

7. The method of claim 1, wherein said maritime vessel is a moveable floating vessel selected from the group consisting of ships, tugs, semi-submersible tenders, hovercrafts, hydrofoils, tankers, boats, luxury yachts and combinations thereof.

8. The method of claim 1, wherein said base is permanently secured to the maritime vessel.

9. The method of claim 1, further comprising a plurality of maritime vessels, each having a satellite based handheld phone system installed thereon.

10. The method of claim 1, wherein said antennae is a fixed mast antennae.

11. The method of claim 1, wherein said duration of the telephone call and the lifetime timer utilize minutes for tracking purposes.

12. The method of claim 1, wherein the monthly report is faxed to the satellite phone network prior to correlation with the lifetime timer.

13. The method of claim 1, wherein the monthly report is emailed to the maritime vessel for correlation with the lifetime timer.

14. The method of claim 1, wherein the monthly report is used by the satellite telephone network to produce an invoice to each maritime vessel.

15. The method of claim 1, where all inbound telephone calls are blocked.

16. The method of claim 1, further comprising a locking feature on the hand held unit to prevent electronic use of the handheld unit.

* * * * *